(12) United States Patent
Choe et al.

(10) Patent No.: US 8,400,538 B2
(45) Date of Patent: Mar. 19, 2013

(54) APPARATUS AND METHOD FOR CAPTURING IMAGES

(75) Inventors: Won-hee Choe, Gyeongju-si (KR); Chang-yeong Kim, Yongin-si (KR); Seong-deok Lee, Suwon-si (KP)

(73) Assignee: Samsung Electronics Co., Ltd., Suwon-Si (KR)

( * ) Notice: Subject to any disclaimer, the term of this patent is extended or adjusted under 35 U.S.C. 154(b) by 410 days.

(21) Appl. No.: 12/007,684

(22) Filed: Jan. 14, 2008

(65) Prior Publication Data

US 2008/0259192 A1    Oct. 23, 2008

(30) Foreign Application Priority Data

Apr. 23, 2007  (KR) ........................ 10-2007-0039364

(51) Int. Cl.
*H04N 5/335* (2006.01)
(52) U.S. Cl. ........................ 348/273; 348/272
(58) Field of Classification Search .................. None
See application file for complete search history.

(56) References Cited

U.S. PATENT DOCUMENTS

| | | | |
|---|---|---|---|
| 6,633,333 B1* | 10/2003 | Spencer | 348/272 |
| 6,657,663 B2 | 12/2003 | Morris | 348/273 |
| 7,129,466 B2* | 10/2006 | Iwasaki | 250/214.1 |
| 2003/0189656 A1* | 10/2003 | Shinohara | 348/272 |
| 2005/0030398 A1* | 2/2005 | Summa | 348/272 |
| 2005/0133690 A1* | 6/2005 | Higashitsutsumi | 250/208.1 |
| 2006/0181623 A1* | 8/2006 | Endo et al. | 348/272 |
| 2006/0261280 A1* | 11/2006 | Oon et al. | 250/370.08 |

FOREIGN PATENT DOCUMENTS

| | | |
|---|---|---|
| JP | 2002-142228 | 5/2002 |
| JP | 2002-513145 | 5/2002 |
| JP | 2005-6066 | 1/2005 |
| JP | 2006-165362 | 6/2006 |
| JP | 2006-237737 | 9/2006 |

\* cited by examiner

*Primary Examiner* — Chieh M Fan
*Assistant Examiner* — Angel L Garces-Rivera
(74) *Attorney, Agent, or Firm* — Staas & Halsey LLP

(57) ABSTRACT

Provided are an apparatus and a method for capturing images by applying different color filters to two pixel regions with IR blocking filters removed so that optical signals in the visible band and IR signals can be received. The apparatus includes a filter unit having a plurality of filters having different wavelength bands; a sensor unit sensing optical signals passing through the filters; and a signal-extraction unit extracting detailed optical signals in respective wavelength bands by using the difference between the sensed optical signals.

24 Claims, 12 Drawing Sheets

APPARATUS AND METHOD FOR CAPTURING IMAGES

CROSS-REFERENCE TO RELATED APPLICATION

This application claims priority from Korean Patent Application No. 10-2007-39364 filed on Apr. 23, 2007 in the Korean Intellectual Property Office, the disclosure of which is incorporated herein by reference in its entirety.

BACKGROUND OF THE INVENTION

1. Field of the Invention

The present invention relates generally to an apparatus and a method for capturing images, and more particularly to an apparatus and a method for capturing images by applying different color filters to two pixel regions with IR blocking filters removed so that optical signals in the visible band and IR signals can be received.

2. Description of the Prior Art

Recently, an increasing number of devices, such as phones, are equipped with cameras.

Cameras generally include lenses and image sensors. Lenses collect light reflected by objects, and image sensors detect light collected by lenses and convert them into digital image signals. Image sensors are classified into image pickup tubes and solid image sensors, typical examples of which include CCDs (Charged Coupled Devices) and CMOSs (Complementary Metal Oxide Semiconductors).

In order to increase the resolution of images captured with cameras, it is customary to decrease the unit area of each pixel within the sensing region while maintaining the total area of the sensing region. Particularly, a decrease in unit area of pixels leads to an increase in the number of pixels in the sensing region, which means that high-resolution images are obtained. However, this approach has a problem in that, although high-resolution images may be obtained, high-sensitivity images are hard to obtain. This is because a decrease in the unit area of pixels results in reduction in the amount of light reaching respective pixels.

Therefore, stacked image sensors have been developed so that all major visible light signals, e.g. red; green, and blue signals (hereinafter, abbreviated as R, G, B signals) can be extracted from a single pixel region while the pixel size remains the same. These image sensors are based on the principle that, when light is absorbed by a silicon layer of the sensors, the depth of absorption varies depending on the wavelength of light. As a result, R, G, B signals are detected at different depths of the silicon layer. However, this type of image sensor has a problem in that, although the resolution of images may be improved because all the R, G, B signals can be obtained from a single pixel, the color reproduction characteristics are degraded because it is difficult to accurately differentiate R, G, B signals from the silicon layer. In other words, it is difficult to obtain high-quality images.

Consequently, it is necessary to provide means to improve the color reproduction performance while reducing degradation in the resolution of the images.

SUMMARY OF THE INVENTION

Accordingly, the present invention has been made to solve the above-mentioned problems occurring in the prior art, and the present invention provides an apparatus and a method for capturing images by applying different color filters to two pixel regions with IR blocking filters removed so that optical signals in the visible band and IR signals are received and used to implement images.

Further to the above aspect, the present invention has additional technical aspects not described above, which can be clearly understood by those skilled in the art from the following description.

In accordance with one aspect of the present invention, there is provided an apparatus for capturing images, including a filter unit having a plurality of filters having different wavelength bands; a sensor unit sensing optical signals passing through the filters; and a signal-extraction unit extracting detailed optical signals in respective wavelength bands by using a difference between the sensed optical signals.

In accordance with another aspect of the present invention, there is provided a method of taking images, which includes sensing optical signals passing through a plurality of filters having different wavelength bands; and extracting detailed optical signals in respective wavelength bands by using a difference between the sensed optical signals.

Particulars of other embodiments are incorporated in the following description and attached drawings.

BRIEF DESCRIPTION OF THE DRAWINGS

The above and other aspects, features and advantages of the present invention will be apparent from the following detailed description taken in conjunction with the accompanying drawings, in which.

DETAILED DESCRIPTION OF THE EXEMPLARY EMBODIMENTS

Figure 1:
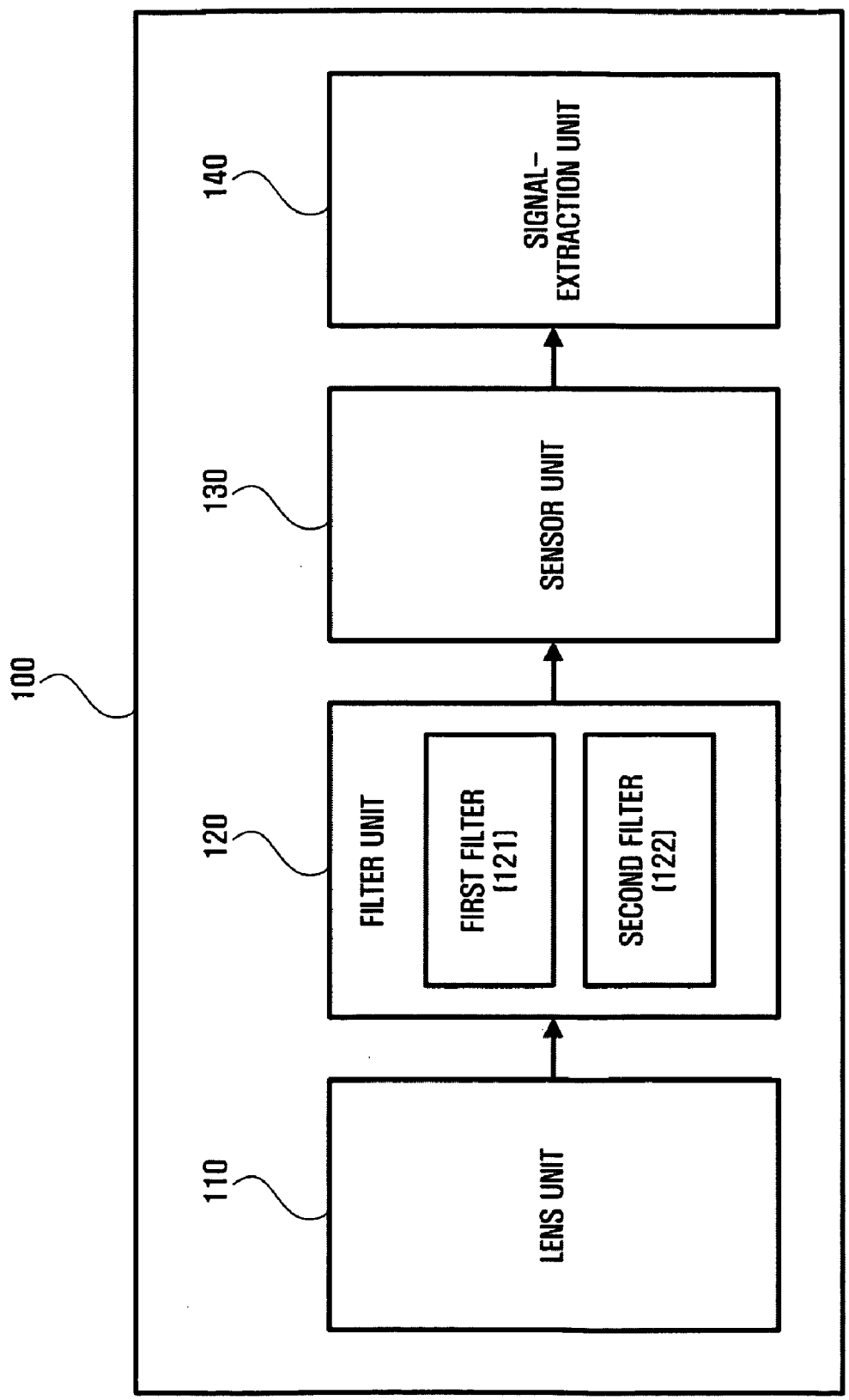
FIG. 1 is a block diagram showing an image-capturing apparatus according to an embodiment of the present invention.

Advantages and features of the present invention, and ways to achieve them will be apparent from embodiments of the present invention described below together with the accompanying drawings. However, the scope of the present invention is not limited to such embodiments and the present invention may be realized in various forms. The embodiments to be described below are provided to properly disclose the present invention and assist those skilled in the art to completely understand the present invention. The present invention is defined only by the scope of the appended claims. Also, the same reference numerals are used to designate the same elements throughout the specification.

Hereinafter, exemplary embodiments of the present invention will be described with reference to the accompanying drawings.

FIG. 1 is a block diagram showing an image-capturing apparatus according to an embodiment of the present invention. The image-capturing apparatus 100 includes a lens unit 110, a filter unit 120, a sensor unit 130, and a signal-extraction unit 140.

The lens unit 110 includes at least one lens for collecting incident light. The number of lenses may vary depending on usage and requirements. Lenses may be arranged on the same plane in various shapes. For example, lenses may be arranged in a horizontal or vertical line. Alternatively, lenses may have a matrix-type arrangement (i.e. arranged both horizontally and vertically).

The filter unit 120 is adapted to filter optical signals collected by the lens unit 110. Particularly, the filter unit 120 does not pass all optical signals collected by the lens unit 110, but optical signals in a predetermined wavelength band alone. According to an embodiment of the present invention, the filter unit 120 includes first and second filters 121 and 122.

The first and second filters 121 and 122, which constitute the filter unit 120, are preferably adapted to pass optical signals in different wavelength bands so that the signal-extraction unit 140 (described later) can extract detailed optical signals in a specific wavelength band.

In addition, the first and second filters 121 and 122 may have IR blocking filters removed from them so that they pass not only optical signals in the visible band, but also IR signals. Whether to remove the IR blocking filters depends on the wavelength bands applied to respective filters 121 and 122.

Figure 2:
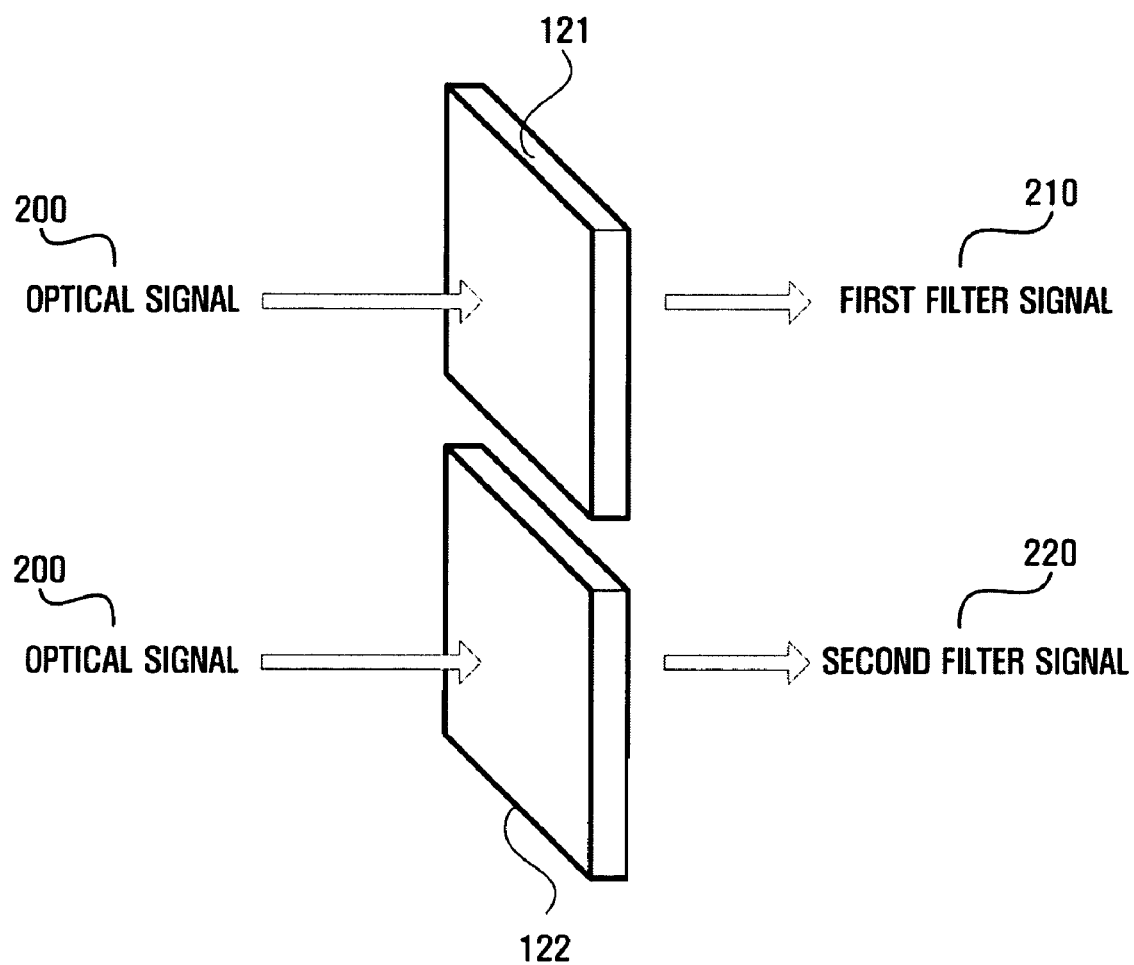
FIG. 2 shows first and second filters constituting the filter unit of FIG. 1.

FIG. 2 shows the first and second filters, which constitute the filter unit of FIG. 1, arranged side by side so as to pass different filter signals 210 and 220 when the same optical signals 200 are incident.

For example, when the first filter 121 is a green filter, the green signal of the incident optical signal 200 passes through. The first filter 121 may have the IR blocking filter removed from it. In this case, the IR signal also passes through the first filter 121. As a result, a combination of green and IR signals passes through the first filter 121 as the first filter signal 210.

When the second filter 122 is a magenta filter, the magenta signal of the incident optical signal 200 passes through. The second filter 122 may have the IR blocking filter removed from it, as in the case of the first filter 121, so that the IR signal also passes through the second filter 122. As a result, a combination of magenta and IR signals passes through the second filter 122 as the second filter signal 220.

The magenta signal, which passes through the second filter 122, includes blue and red signals, which are separately sensed by the sensor unit 130 (described later).

Figure 3:
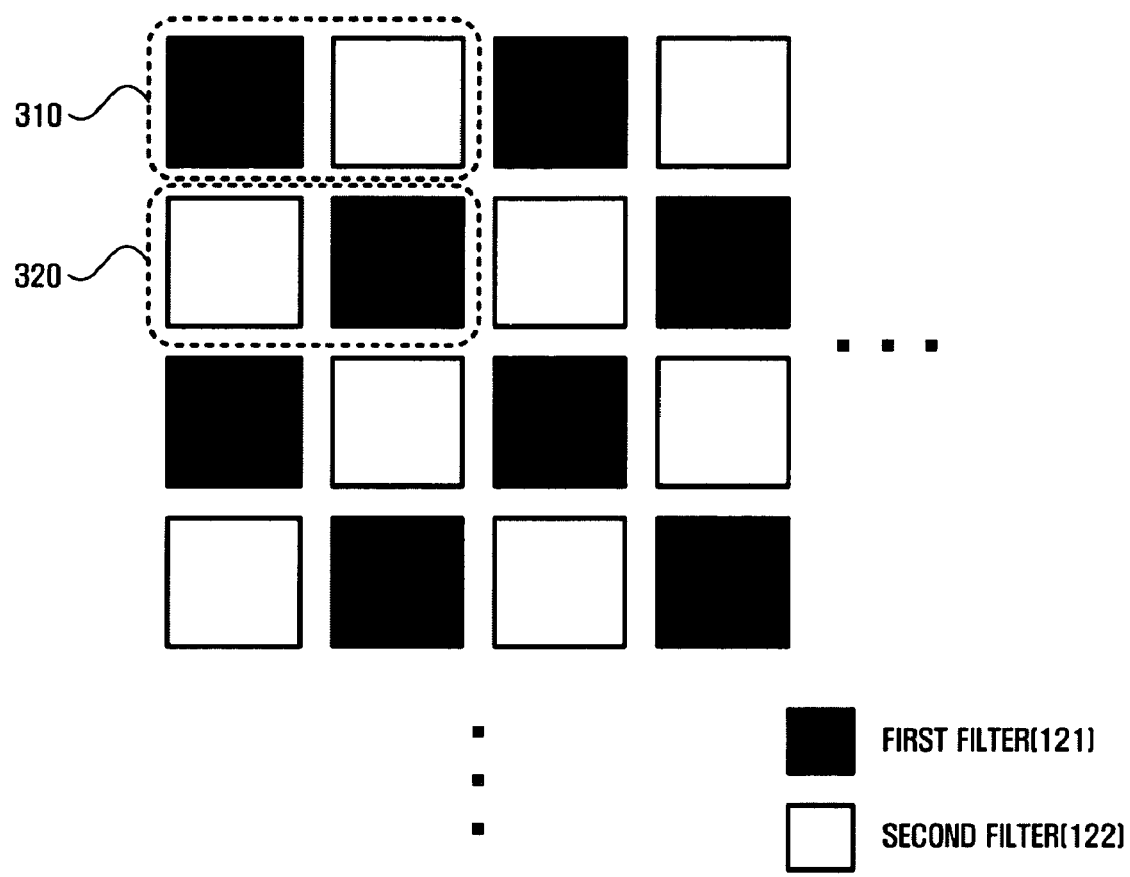
FIG. 3 shows an exemplary arrangement of first and second filters constituting the filter unit of FIG. 1.

According to an embodiment of the present invention, respective filters constituting the filter unit 120 may be defined pixel by pixel. Particularly, two adjacent pixels may constitute a basic structure in such a manner that they correspond to the first and second filters 121 and 122, respectively, as shown in FIG. 3.

The first and second filters 121 and 122 may be arranged in various manners. In the case of the arrangement shown in FIG. 3, first and second filters 121 and 122 are arranged side by side in the horizontal direction and constitute a filter combination, which is repeated in each row.

More particularly, in the case of a filter combination 310 in the first row, the first and second filters 121 and 122 are arranged on the left and right sides, respectively. In the case of a filter combination 320 in the second row, the first and second filters 121 and 122 are arranged on the right and left sides, respectively. As such, odd-numbered rows have the same filter combination 310 repeated along them, and even-numbered rows also have the same filter combination 320 repeated along them.

Referring to FIG. 1, the sensor unit 130 is adapted to sense optical signals, which have passed through the filter unit 120, based on their wavelength band. The sensor unit 130 may include a number of sensor cells corresponding to pixels. Each sensor cell has a plurality of optical-signal-sensing layers stacked on one another, which have different degrees of spectroscopic sensitivity, so as to sense optical signals in wavelength bands corresponding to the sensing layers, respectively.

The signal-extraction unit 140 is adapted to extract detailed optical signals in respective wavelength bands from the optical signals sensed by the sensor unit 130. As used herein, a detailed optical signal refers to an optical signal corresponding to a specific wavelength band among incident optical signals. For example, a red signal, a green signal, a blue signal, or an IR signal may be a detailed optical signal.

In order to extract detailed optical signals, the signal-extraction unit 140 may use optical signals sensed by the sensor unit 130 without modifying them. Alternatively, the signal-extraction unit 140 may use the difference between a plurality of optical signals sensed by different sensor cells. The process for extracting detailed optical signals by using the difference between a plurality of optical signals will be described later in more detail with reference to FIGS. 8, 10, and 12.

The signal-extraction unit 140 extracts optical signals by measuring a photocurrent outputted by the sensor unit 130. Each sensor cell may have a plurality of signal-extraction units 140 in order to extract optical signals in respective wavelength bands.

Figure 4:
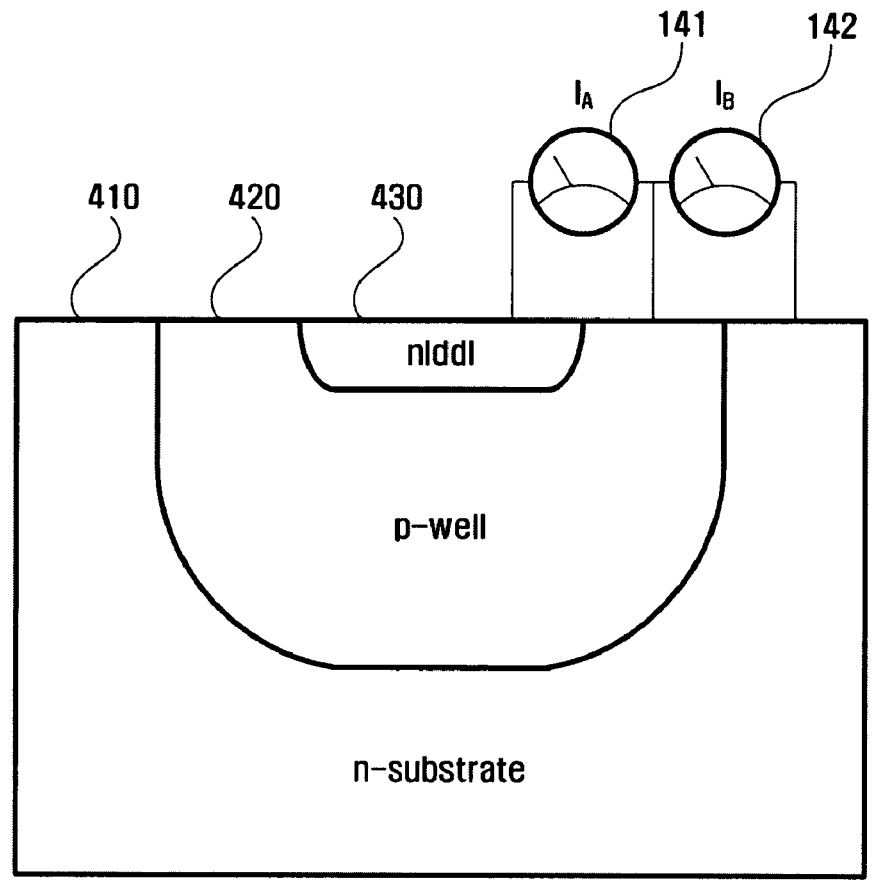
FIG. 4 shows the detailed structure of a sensor cell constituting the sensor unit of FIG. 1.

FIG. 4 shows the detailed structure of a sensor cell constituting the sensor unit of FIG. 1. As shown, the sensor cell includes first and second photoelectric conversion layers.

Among signals that have passed through the filter, the first photoelectric conversion layer converts an optical signal having a long wavelength (i.e., having a large transmission distance), such as a red optical signal, into a digital signal. The first photoelectric conversion layer has amorphous silicon layers 410 and 420 injected with first and second conductive impurities, respectively, and stacked on each other.

Particularly, the first photoelectric conversion layer has amorphous silicon layers 410 and 420 injected with n-type and p-type impurities, respectively, and stacked on each other.

Among electric signals that have passed through the filter, the second photoelectric conversion layer converts an optical signal having a short wavelength (i.e. having a small transmission distance), such as a blue optical signal, into a digital signal. The second photoelectric conversion layer has amorphous silicon layers 420 and 430 injected with second and first conductive impurities, respectively, and stacked on each other.

Particularly, the second photoelectric conversion layer has amorphous silicon layers 420 and 430 injected with p-type and n-type impurities, respectively, and stacked on each other.

Figure 5:
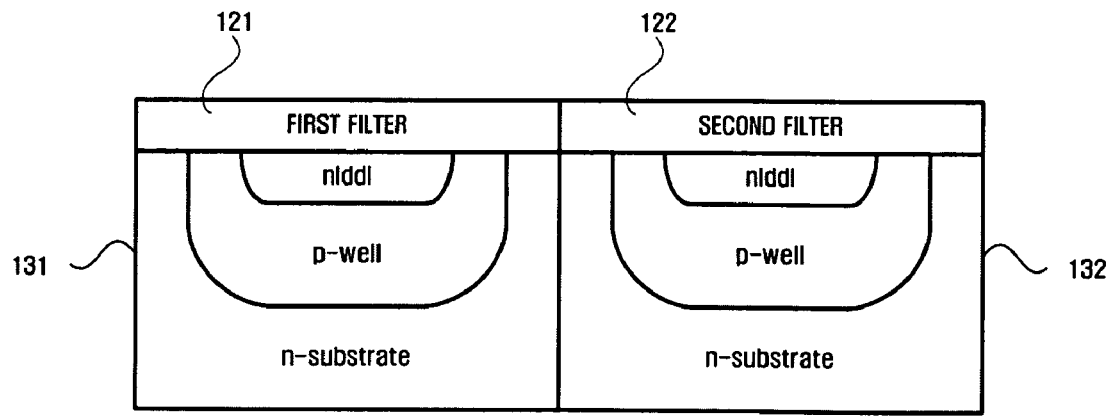
FIG. 5 shows the arrangement of a filter unit and a sensor unit according to an embodiment of the present invention.

Besides, the sensor cell may be connected to a signal-extraction unit 141 for measuring a photocurrent IA resulting from optical signals having a short wavelength, a signal-extraction unit 142 for measuring a photocurrent IB resulting from optical signals having a long wavelength, and a conductive structure (not shown) for outputting signals sensed by the photoelectric conversion layers. As shown in FIG. 5, corresponding filters are arranged on top of the pixel shown in FIG. 4.

FIG. 5 shows the arrangement of a filter unit and a sensor unit according to an embodiment of the present invention. Particularly, first and second filters 121 and 122 are arranged so as to correspond to different sensor cells.

When the first filter 121 is a green filter having the IR blocking filter removed from it, a combination of green and IR signals is transmitted to the first sensor cell 131. The first photoelectric conversion layer of the first sensor cell 131 senses an IR signal, which has a long wavelength, from the combination of signals, and the second photoelectric conversion layer senses a green signal, which has a short wavelength, from the combination of signals.

When the second filter 122 is a magenta filter without an IR blocking filter, a combination of magenta and IR signals is transmitted to the second sensor cell 132. The magenta signal includes a red signal, which is an optical signal having a long wavelength, and a blue signal, which is an optical signal having a short wavelength. The second photoelectric conversion layer of the second sensor cell 132 senses a combination of red and IR signals, which have a long wavelength, from the combination of signals, and the first photoelectric conversion layer senses a blue signal, which has a short wavelength, from the combination of signals. The first photoelectric conversion layer of the second sensor cell 132 senses a combination 530 of red and IR signals, which have a long wavelength, from the combination of signals, and the second photoelectric conversion layer senses a blue signal 540, which has a short wavelength, from the combination of signals.

As such, the green signal has passed through the first filter 121, and both red and blue signals have passed through the second filter 122. The red signal is combined with the IR signal, which has a similar wavelength band, and is detected by the sensor unit 130. The subsequent process for extracting the red signal from the sensed combination of red and IR signals will be described later in more detail with reference to FIG. 8.

Figure 6:
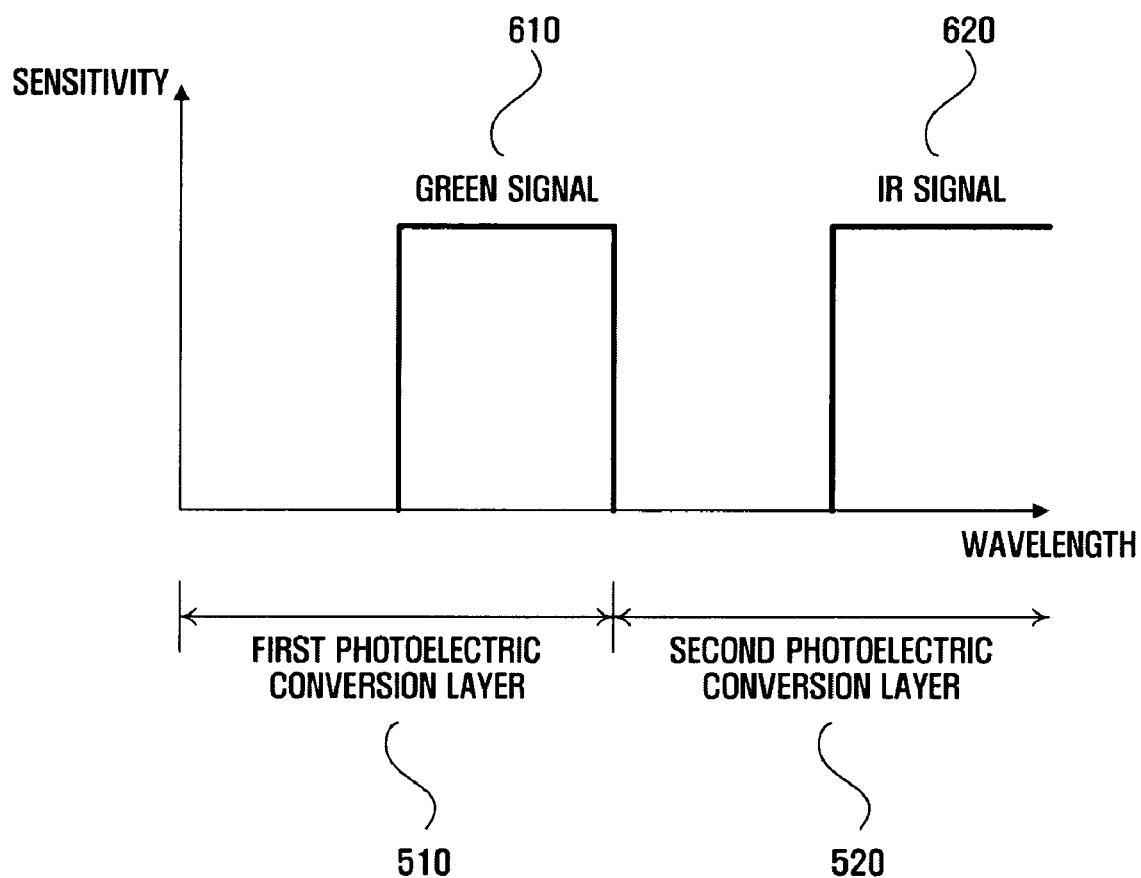
FIG. 6 shows the spectrum of optical signals that have passed through a first filter according to an embodiment of the present invention.

FIG. 6 shows the spectrum of optical signals that have passed through a first filter according to an embodiment of the present invention. Particularly, a first filter 121, which has the IR blocking filter removed from it and which passes a green signal 610, is used so that, among incident optical signals, green and IR signals 610 and 620 pass through.

The green signal 610 is sensed by the first photoelectric conversion layer 510 of the sensor cell, and the IR signal 620 is sensed by the second photoelectric conversion layer 520 of the sensor cell.

Figure 7:
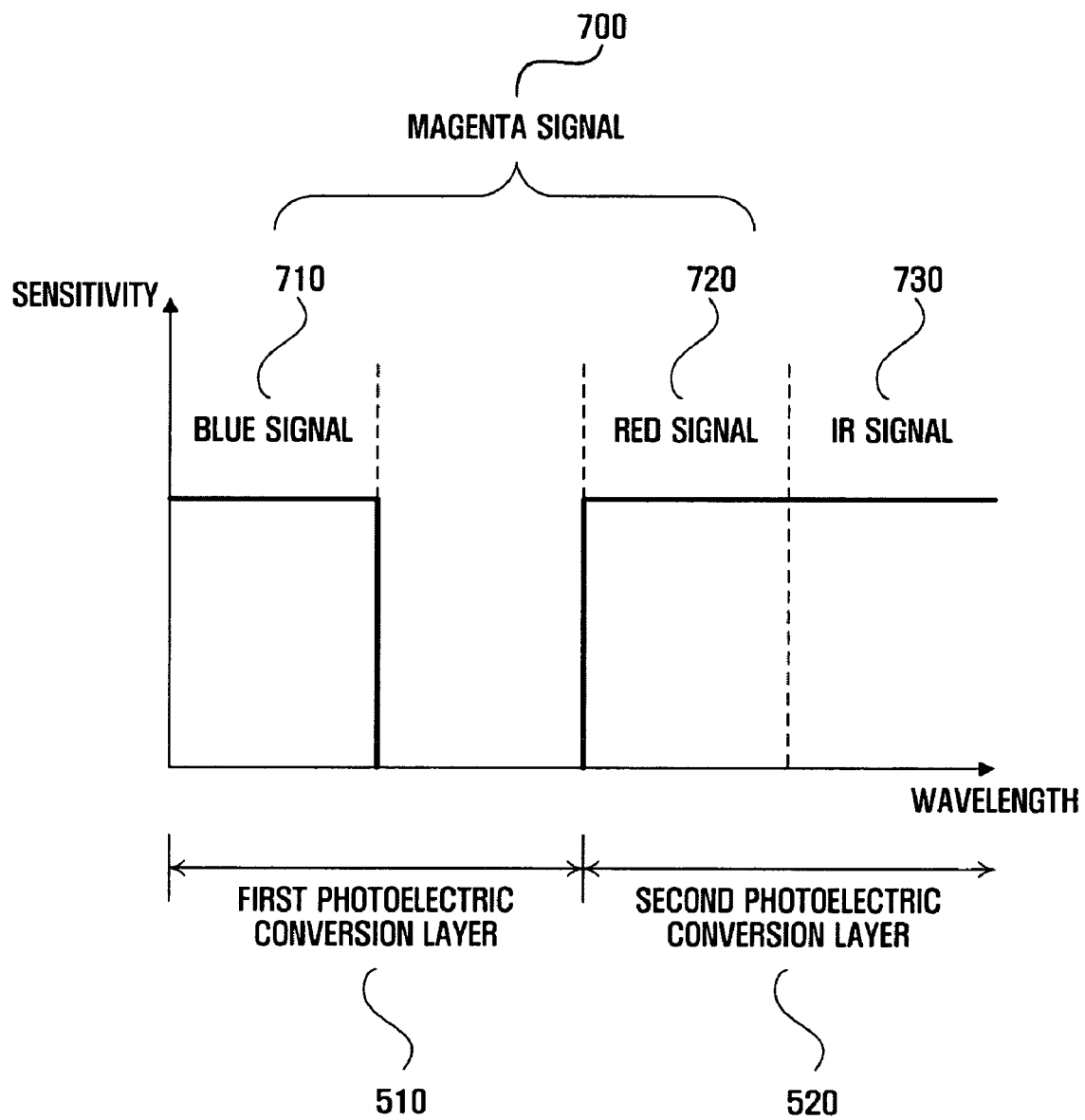
FIG. 7 shows the spectrum of optical signals that have passed through a second filter according to an embodiment of the present invention.

FIG. 7 shows the spectrum of optical signals that have passed through a second filter according to an embodiment of the present invention. Particularly, a second filter 122, which has the IR blocking filter removed from it and which passes a magenta signal 700, is used so that, among incident optical signals, magenta and IR signals 700 and 730 pass through.

The magenta signal 700 includes blue and red signals 710 and 720. The blue signal 710 is are sensed by the first photoelectric conversion layer 510 of the sensor cell. The red signal 720 and the IR signal 730 are sensed by the second photoelectric conversion layer of the sensor cell.

Since the first and second filters 121 and 122 filter optical signals in different wavelength bands, the sensor cell separately senses optical signals in different wavelength bands from optical signals in the visible band. Particularly, a green signal 610 in the medium wavelength band passes through a filter, and red and blue signals 720 and 710, which undergo lesser interference, pass through another filter. This reduces the interference between optical signals.

As such, different optical signals pass through the first and second filters 121 and 122 and, for this reason, the depth of the photoelectric conversion layer of the first sensor cell 131 may differ from that of the photoelectric conversion layer of the second sensor cell 132. More particularly, the depth of first photoelectric conversion layer of the first sensor cell 131 may differ from that of the first photoelectric conversion layer of the second sensor cell 132, and the depth of the second photoelectric conversion layer of the first sensor cell 131 may differ from that of the second photoelectric conversion layer of the second sensor cell 132.

The red signal 720, which has passed through the second filter 122, is sensed by the second photoelectric conversion layer 520 of the sensor cell together with the IR signal 730. In other words, a mixture of red and IR signals 720 and 730 is sensed by the second sensor cell 132, which requires that the red signal 720 be extracted from the mixed signals.

Figure 8:
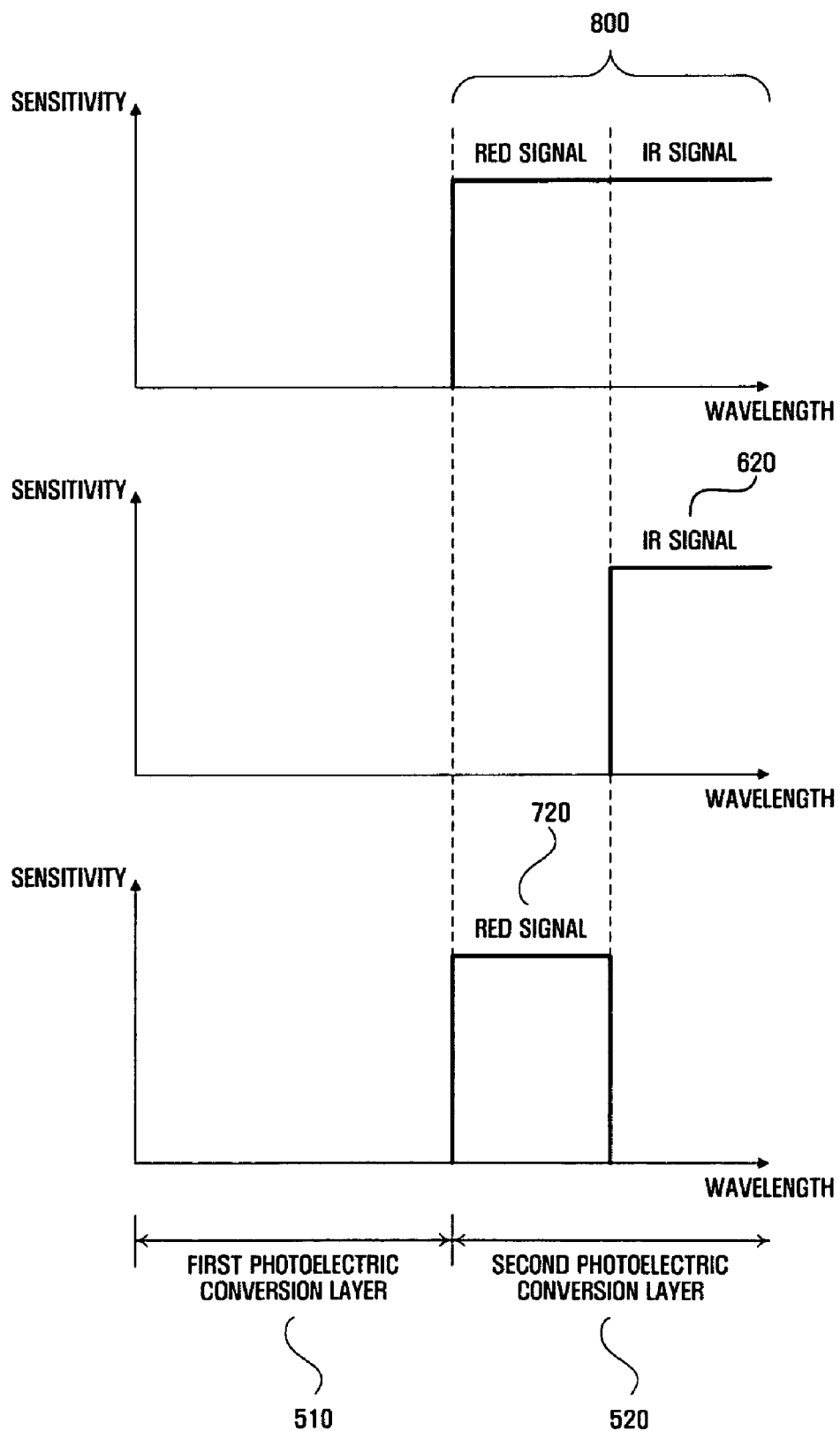
FIG. 8 shows extraction of a red signal according to an embodiment of the present invention.

Such an extraction process may be based on the difference between optical signals, as shown in FIG. 8. Particularly, the signal-extraction unit 140 subtracts the IR signal 620, which has passed through the first filter 121, from the combination 800 of red and IR signals, which have passed through the second filter 122, among optical signals sensed by the second optical conversion layer 520. The red signal 720 is extracted in this manner.

Consequently, optical signals 610, 710, and 720 in the visible band are separately extracted via two pixel regions with reduced interference among the signals. This improves the resolution and screen quality. In addition, extraction of the IR signal 620 separate from optical signals in the visible band enables not only image implementation based on the optical signals 610, 710, and 720 in the visible band, but also that based on the IR signal 620 depending on the situation.

Figure 9:
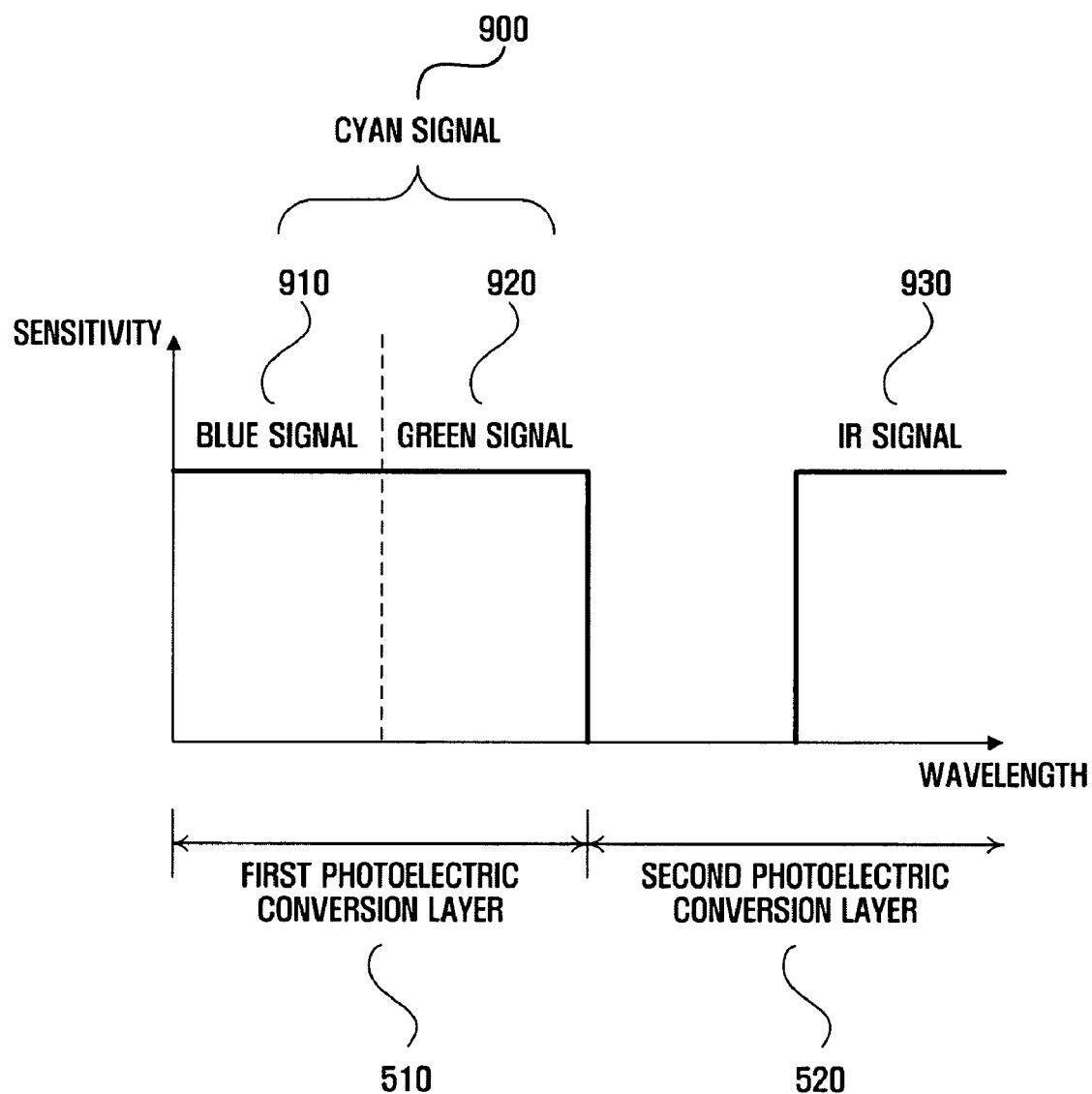
FIG. 9 shows the spectrum of optical signals that have passed through a first filter according to another embodiment of the present invention.

FIG. 9 shows the spectrum of optical signals that have passed through a first filter according to another embodiment of the present invention. Particularly, a first filter 121, which has the IR blocking filter removed from it and which passes a cyan signal 900, is used so that, among incident optical signals, a cyan signal 900 and an IR signal pass through.

The cyan signal 900 includes blue and green signals 910 and 920, which are sensed by the first photoelectric conversion layer 510 of the sensor cell. The IR signal 930 is sensed by the second photoelectric conversion layer of the sensor cell.

Particularly, the filter unit 120 includes a first filter 121 for passing cyan and IR signals 900 and 930, and a second filter 122 for passing magenta and IR signals 700 and 730.

The blue and green signals 910 and 920, which pass through the first filter 121, are sensed by the first photoelectric conversion layer 510 of the sensor cell while being mixed with each other. This requires that the blue and green signals 910 and 920 be separately extracted from the mixed signals.

Figure 10:
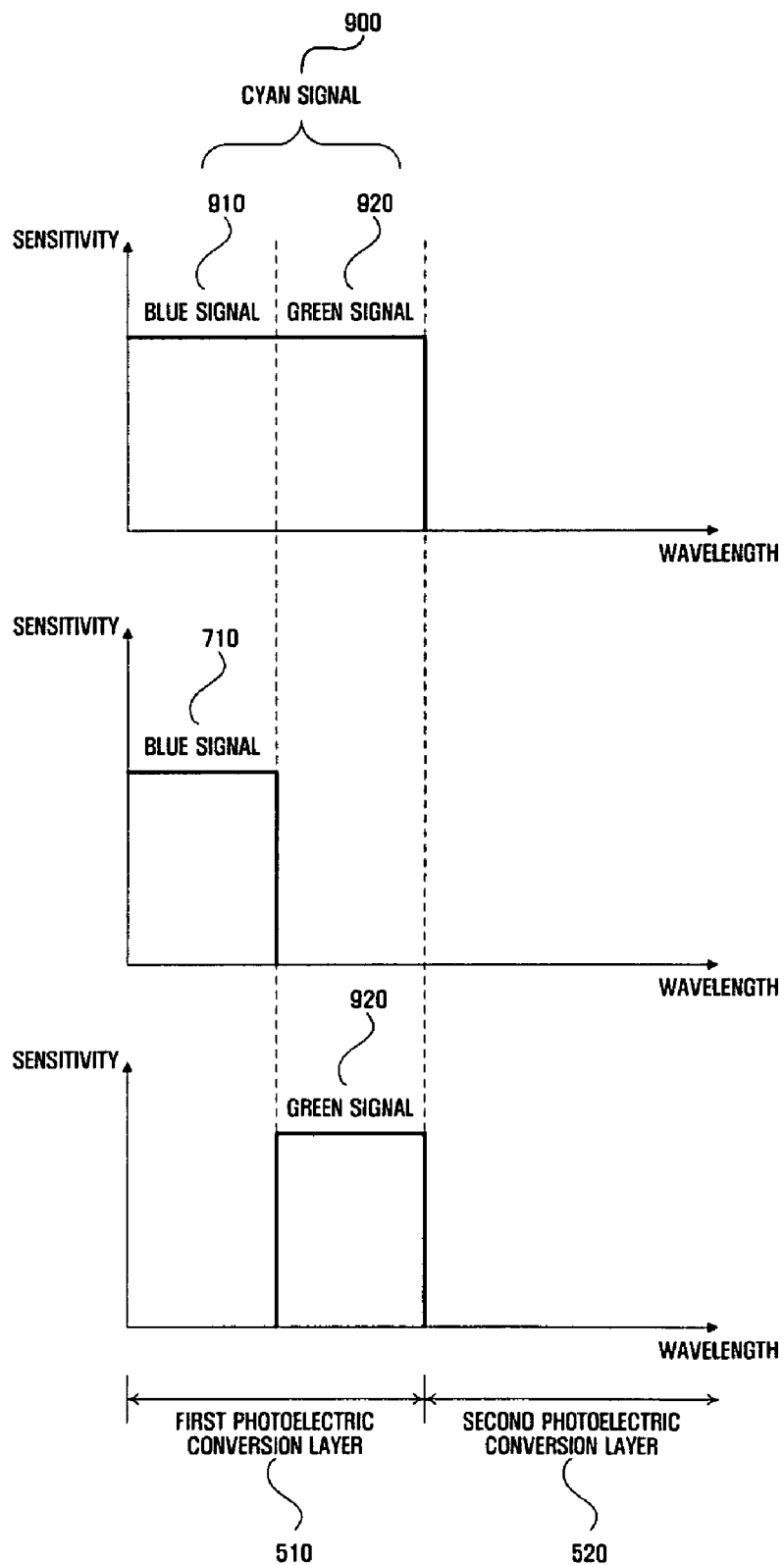
FIG. 10 shows extraction of a green signal according to another embodiment of the present invention.

Such an extraction process may be based on the difference between optical signals, as shown in FIG. 10. Particularly, the signal-extraction unit 140 subtracts the blue signal 710, which has passed through the second filter 122, from the combination 900 of blue and green signals 910 and 920, which have passed through the first filter 121. The green signal 920 is extracted in this manner. In other words, among the optical signals sensed by the first photoelectric conversion layer 510, the signal-extraction unit 140 extracts the blue signal 710 from the optical signal that has passed through the second filter 122, and extracts the green signal 920 based on the difference between optical signals. As a result, blue and green signals 710 and 920 are extracted with no interference between them.

Among the optical signals sensed by the second photoelectric conversion layer 520, the red signal 720 is extracted as shown in FIG. 8. Consequently, optical signals 710, 720, and 920 in the visible band are separately extracted via two pixel regions with reduced interference among the signals.

Figure 11:
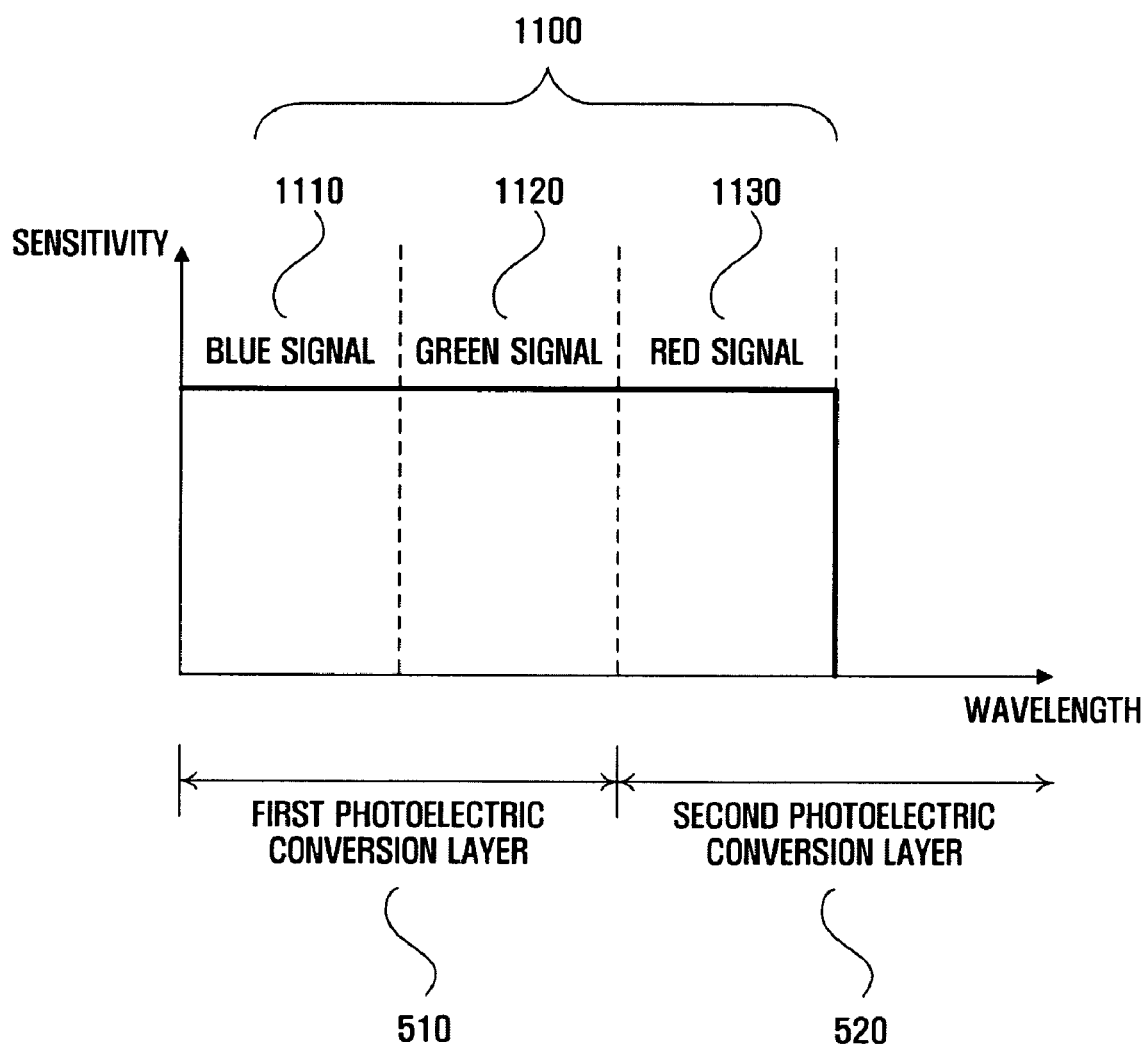
FIG. 11 shows the spectrum of optical signals that have passed through a second filter according to another embodiment of the present invention.

FIG. 11 shows the spectrum of optical signals that have passed through a second filter according to another embodiment of the present invention. A second filter 122, which has an IR blocking filter and passes signals 1100 in all visible bands, is used so that, among incident optical signals, blue, green, and red signals 1110, 1120, and 1130 (i.e., signals 1100 in visible bands) pass through while the IR signal is blocked.

The blue and green signals 1110 and 1120 are sensed by the first photoelectric conversion layer 510 of the sensor cell, and the red signal 1130 is sensed by the second photoelectric conversion layer 520 of the sensor cell.

Particularly, the filter unit 120 includes a first filter 121 for passing green and IR signals 610 and 620, and a second filter 122 for passing blue, green, and red signals 1110, 1120 and 1130.

The blue and green signals 1110 and 1120, which pass through the second filter 122, are sensed by the first photoelectric conversion layer 510 of the sensor cell while being mixed with each other. This requires that the blue and green signals 1110 and 1120 be separately extracted from the mixed signals.

Figure 12:
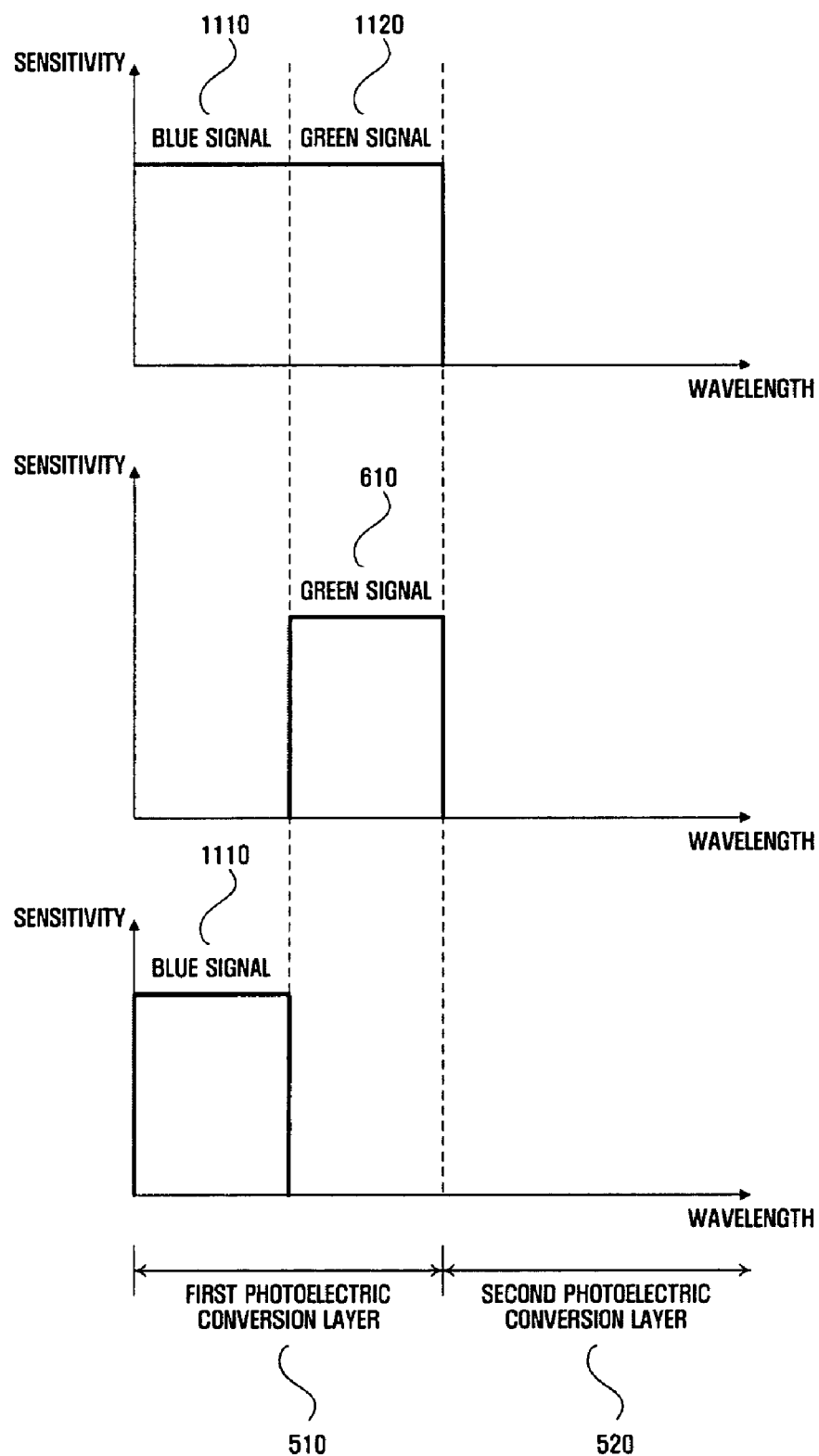
FIG. 12 shows extraction of blue and green signals according to another embodiment of the present invention.

Such an extraction process may be based on the difference between optical signals, as shown in FIG. 12. Particularly, the signal-extraction unit 140 subtracts the green signal 610, which has passed through the first filter 121, from the combination of blue and green signals 1110 and 1120, which have passed through the second filter 122. The blue signal 1110 is extracted in this manner. In other words, among the optical signals sensed by the first photoelectric conversion layer 510, the signal-extraction unit 140 extracts the green signal 610 from the optical signal that has passed through the first filter 121, and extracts the blue signal 1110 based on the difference between optical signals. As a result, green and blue signals 610 and 1110 are extracted with no interference between them.

The red signal 1130 is only sensed by the second photoelectric conversion layer 520. Consequently, optical signals 610, 1130, and 1110 in the visible band are separately extracted via two pixel regions with reduced interference among the signals.

Figure 13:
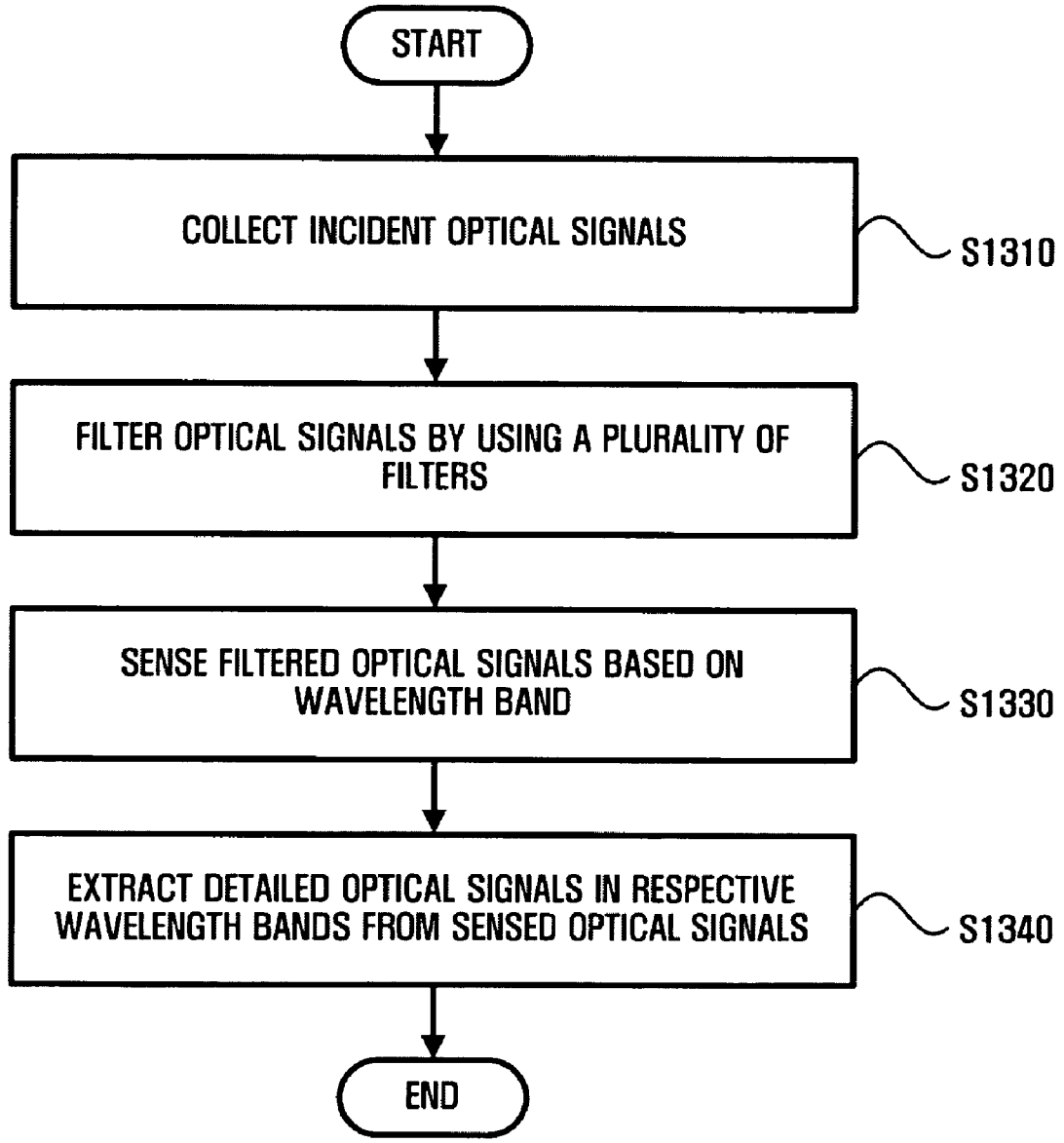
FIG. 13 is a flowchart showing a procedure for capturing images according to an embodiment of the present invention.

FIG. 13 is a flowchart showing a procedure for capturing images according to an embodiment of the present invention. When light is reflected by an object and is incident on the lens unit 110, the lens unit 110 collects the incident optical signals S1310.

The collected optical signals are transmitted to the filter unit 120, which filters the optical signals by using two filters S1320. The filter unit 120 may include first and second filters 121 and 122. For example, the filter unit 120 may include a first filter 121 for passing green and IR signals 610 and 620, and a second filter 122 for passing blue, red, and IR signals 710, 720, and 730. Alternatively, the filter unit 120 may include a first filter 121 for passing blue, green, and IR signals 910, 920, and 930, and a second filter 122 for passing blue, red, and IR signals 710, 720, and 730. Furthermore, the filter unit 120 may include a first filter 121 for passing green and IR signals 610 and 620, and a second filter 122 for passing red, green, and blue signals 1130, 1120, and 1110.

After passing the filter unit 120, the filtered optical signals are transmitted to the sensor unit 130, which senses the transmitted optical signals based on their wavelength band S1330. To this end, each sensor cell of the sensor unit 130 may have a plurality of optical-signal-sensing layers stacked on one another, which have different degrees of spectroscopic sensitivity, so as to sense optical signals in wavelength bands corresponding to the sensing layers, respectively.

When the sensor unit 130 senses the optical signals, a photocurrent is generated for each wavelength and is transmitted to the signal-extraction unit 140.

The signal-extraction unit 140 extracts detailed optical signals in respective wavelength bands by using the transmitted photocurrent S1340. When the photoelectric conversion layer of the same sensor cell senses at least two optical signals having similar wavelength bands, they are sensed as combined signals. In this case, the signal-extraction unit 140 uses the difference between optical signals, which have been sensed by the sensor cell, among optical signals that have passed through the first and second filters 121 and 122, respectively, so as to extract detailed optical signals.

As mentioned above, the apparatus and method for capturing images according to the present invention has the following advantages.

First, by applying different color filters to two pixel regions with IR blocking filters removed so that optical signals in the visible band and IR signals are received and used to implement images, the degradation of image resolution is avoided, and the color regeneration performance is improved.

Second, by receiving IR signals as well as optical signals in the visible band, images can be implemented by using signals suitable for the luminance environment.

Third, by removing the IR blocking filters, the cost of the image-capturing apparatus can be reduced.

The effects of the present invention are not limited to the above-mentioned effects, and other effects not mentioned above can be clearly understood from the definitions in the claims by one skilled in the art.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. An apparatus for capturing images, comprising:
   a filter unit having a plurality of filters having different wavelength bands;
   a sensor unit including a plurality of sensor cells corresponding to a plurality of pixels and sensing optical signals passing through the plurality of filters; and
   a signal-extraction unit capable of extracting at least one of detailed optical signals in respective wavelength bands including all of a red signal, a green signal, and a blue signal by using a difference between a combination of optical signals having passed through a first filter and sensed by an optical conversion layer, and at least one optical signal having passed through a second filter and sensed by the same optical conversion layer having sensed the combination of optical signals, wherein the sensor unit has a plurality of optical-signal-sensing layers stacked on one another, the optical-signal-sensing layers having different degrees of spectroscopic sensitivity and having different depths according to filter type, so as to sense optical signals corresponding to the optical-signal-sensing layers, respectively.

2. The apparatus of claim 1, wherein the first filter passes the green signal and a first infrared (IR) signal, and the second filter passes the blue signal, the red signal, and a second IR signal.

3. The apparatus of claim 2, wherein the signal-extraction unit is adapted to extract the red signal from an optical signal sensed as a combination of the red signal and the second IR signal by using a difference between the optical signal sensed as the combination and the first IR signal.

4. The apparatus of claim 1, wherein the first filter passes a first blue signal, the green signal, and a first infrared (IR) signal, and the second filter passes a second blue signal, the red signal, and a second IR signal.

5. The apparatus of claim 4, wherein the signal-extraction unit is adapted to extract the red signal from an optical signal sensed as a combination of the red signal and the second IR signal by using a difference between the optical signal sensed as the combination and the first IR signal.

6. The apparatus of claim 4, wherein the signal-extraction unit is adapted to extract the green signal from an optical signal sensed as a combination of the first blue signal and the green signal by using a difference between the optical signal sensed as the combination and the second blue signal.

7. The apparatus of claim 1, wherein the first filter passes a first green signal and an infrared (IR) signal, and the second filter passes a red signal, a second green signal, and the blue signal.

8. The apparatus of claim 7, wherein the signal-extraction unit is adapted to extract the red signal and the blue signal from an optical signal sensed as a combination of the red signal, the second green signal, and the blue signal by using a difference between the optical signal sensed as the combination and the first green signal.

9. The apparatus of claim 1, wherein the first filter passes a first optical signal of the plurality of signal and a second optical signal in wavelength bands that are not adjacent to each other; and the second filter passes a third optical signal in a wavelength band including the first optical signal, and a fourth optical signal in a wavelength band that does not include the first optical signal, second optical signal, and third optical signal.

10. The apparatus of claim 9, wherein the signal-extraction unit extracts detailed optical signals included in the third optical signal using the difference between the first optical signal and the third optical signal.

11. The apparatus of claim 1, wherein the first filter passes a first optical signal and a second optical signal of the plurality of optical signals in wavelength bands that are not adjacent to each other; and the second filter that passes a third optical signal of the plurality of optical signals in some of wavelength bands of the first optical signal, and passes a fourth optical signal of the plurality of optical signals in wavelength bands that do not include the first optical signal.

12. The apparatus of claim 11, wherein the signal-extraction unit extracts detailed optical signals included in the fourth optical signal using the difference between the second optical signal and the fourth optical signal.

13. The apparatus of claim 11, wherein the signal-extraction unit extracts detailed optical signals included in the first optical signal using the difference between the first optical signal and the third optical signal.

14. The apparatus of claim 1, wherein the first filter passes a first optical signal of the plurality of optical signals and a second optical signal of the plurality of optical signals in wavelength bands that are not adjacent to each other; and the second filter passes the third optical signal in wavelength bands that do not include the second optical signal.

15. The apparatus of claim 14, wherein the sensor unit includes a plurality of optical-signal-sensing layers stacked on one another, which have different degrees of spectroscopic sensitivity, so as to sense a third optical signal of the plurality of optical signals as a fourth optical signal of the plurality of optical signals and a fifth optical signal of the plurality of optical signals distinctively depending on the wavelengths corresponding to the optical-signal-sensing layers.

16. The apparatus of claim 15, wherein the signal-extraction unit extracts detailed optical signals included in the fourth optical signal using the difference between the first optical signal and the fourth optical signal.

17. A method of capturing images, the method comprising:

sensing, by a sensor unit, optical signals passing through a plurality of sensor cells corresponding to a plurality of pixels each including a plurality of filters having different wavelength bands; and extracting at least one of detailed optical signals in respective wavelength bands including all of a red signal, a green signal, and a blue signal by using a difference between a combination of optical signals having passed through a first filter and sensed by an optical conversion layer, and at least one optical signal having passed through a second filter and sensed by the same optical conversion layer having sensed the combination of optical signals, wherein the sensor unit has a plurality of optical-signal-sensing layers stacked on one another, the optical-signal-sensing layers having different degrees of spectroscopic sensitivity and having different depths according to filter type, so as to sense optical signals corresponding to the optical-signal-sensing layers, respectively.

18. The method of claim 17, wherein the sensing comprises using a plurality of optical-signal-sensing layers staked on one another, the optical-signal-sensing layers having different degrees of spectroscopic sensitivity and having different depths according to filter type, so as to sense optical signals in wavelength bands corresponding to the optical-signal-sensing layers, respectively.

19. The method of claim 17, wherein the first filter passes the green signal and a first infrared (IR) signal, and a second filter passes the blue signal, the red signal, and a second IR signal, the extracting comprises extracting the red signal from an optical signal sensed as a combination of the red signal and the second IR signal by using a difference between the optical signal sensed as the combination and the first IR signal.

20. The method of claim 17, wherein the first filter passes a first blue signal, the green signal, and a first infrared (IR) signal, and the second filter passes a second blue signal, the red signal, and a second IR signal, the extracting comprises extracting the red signal from an optical signal sensed as a combination of the red signal and the second IR signal by using a difference between the optical signal sensed as the combination and the first IR signal; and extracting the green signal from an optical signal sensed as a combination of the first blue signal and the green signal by using a difference between the optical signal sensed as the combination and the second blue signal.

21. The method of claim 17, wherein the first filter passes a first green signal and an infrared (IR) signal, and the second filter passes the red signal, a second green signal, and the blue signal,
- the extracting comprises extracting the red signal and the blue signal from an optical signal sensed as a combination of the red signal, the second green signal, and the blue signal by using a difference between the optical signal sensed as the combination and the first green signal.

22. The method of claim 17, wherein the first filter passes a first optical signal and a second optical signal in wavelength bands that are not adjacent to each other; and
- the second filter passes a third optical signal in a wavelength band including the first optical signal, and a fourth optical signal in a wavelength band that does not include the first optical signal, second optical signal, and third optical signal,
- the extracting includes extracting detailed optical signals included in the third optical signal using the difference between the first optical signal and the third optical signal.

23. The method of claim 17, wherein the first filter passes a first optical signal and a second optical signal of the plurality of optical signals in wavelength bands that are not adjacent to each other; and the second filter passes a third optical signal of the plurality of optical signals in some of wavelength bands of the first optical signal, and passes a fourth optical signal of the plurality of optical signals in wavelength bands that do not include the first optical signal,
- the extracting includes extracting detailed optical signals included in the fourth optical signal using the difference between the second optical signal and the fourth optical signal; and
- extracting detailed optical signals included in the first optical signal using the difference between the first optical signal and the third optical signal.

24. The method of claim 17, wherein the first filter passes a first optical signal and a second optical signal of the plurality of optical signals in wavelength bands that are not adjacent to each other; and the second filter passes a third optical signal of the plurality of optical signals in wavelength bands that do not include the second optical signal,
- the sensing includes sensing the third optical signal as a fourth optical signal of the plurality of optical signals and a fifth optical signal of the plurality of optical signals distinctively depending on the wavelengths corresponding to the optical-signal-sensing layers by having a plurality of optical-signal-sensing layers stacked on one another, which have different degrees of spectroscopic sensitivity; and
- extracting detailed optical signals included in the fourth optical signal using the difference between the first optical signal and the fourth optical signal.

* * * * *